United States Patent
Marino et al.

(10) Patent No.: US 7,564,977 B2
(45) Date of Patent: Jul. 21, 2009

(54) SYSTEM, METHOD AND PROGRAM PRODUCT FOR ANONYMOUS TRANSFER OF MESSAGES

(75) Inventors: Anna Marino, Avellino (IT); Frank Seliger, Hildrizhausen (DE); Bernard Van Acker, Borgerhout (BE)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 11/065,985

(22) Filed: Feb. 24, 2005

(65) Prior Publication Data
US 2005/0190924 A1 Sep. 1, 2005

(30) Foreign Application Priority Data
Feb. 27, 2004 (FR) .................................. 04 368014

(51) Int. Cl.
*H04L 9/00* (2006.01)
(52) U.S. Cl. .................. 380/286; 380/277; 380/285; 380/282; 713/171; 713/157
(58) Field of Classification Search ................. None
See application file for complete search history.

(56) References Cited

U.S. PATENT DOCUMENTS

| 7,050,589 B2 * | 5/2006 | Kwan .......................... 380/286 |
| 7,181,017 B1 * | 2/2007 | Nagel et al. .................. 380/282 |
| 7,254,232 B2 * | 8/2007 | DiSanto et al. ............... 380/37 |
| 2003/0046534 A1 * | 3/2003 | Alldredge ................... 713/153 |
| 2006/0018485 A1 * | 1/2006 | Diefenderfer et al. ....... 380/283 |

OTHER PUBLICATIONS

Dolev S et al "Xor-Trees for efficient anonymous multicst and reception" ACM,NY,US, vol.3,No.2, May 2000, pp. 63-84.*
Dolev S et al.: "Xor-Trees for Efficient Anonymous Multicast and Reception," ACM Transactions on Information and System Security, ACM, New York, NY, US, vol. 3, No. 2, May 2000, pp. 63-84, XP001063774, ISSN: 1094-9224.

* cited by examiner

*Primary Examiner*—Nasser G Moazzami
*Assistant Examiner*—Fikremariam Yalew
(74) *Attorney, Agent, or Firm*—Arthur J. Samodovitz

(57) ABSTRACT

A final agent of the message provides a first encryption key to a first agent, interposed between a message sender and the final agent. The first agent but not the final agent knows an identity of the sender. The final agent provides a second encryption key to a second agent, interposed between the sender and the final agent. The second agent knows an identity of the sender. The first agent generates a third encryption key and provides the first encryption key and the third encryption key to the sender. The second agent generates a fourth encryption key and provides the second encryption key and the fourth encryption key to the sender. The first agent receives from the sender a message encrypted with the first, second, third and fourth keys, and in response, decrypts the message based on the third key. Afterwards, the first agent provides the message decrypted based on the third key to the second agent. In response, the second agent decrypts, based on the fourth key, the message provided by the first agent. The message decrypted based on the third and fourth keys is provided to the final agent. In response, the final agent decrypts, based on the first and second keys, the message decrypted based on the third and fourth keys.

12 Claims, 8 Drawing Sheets

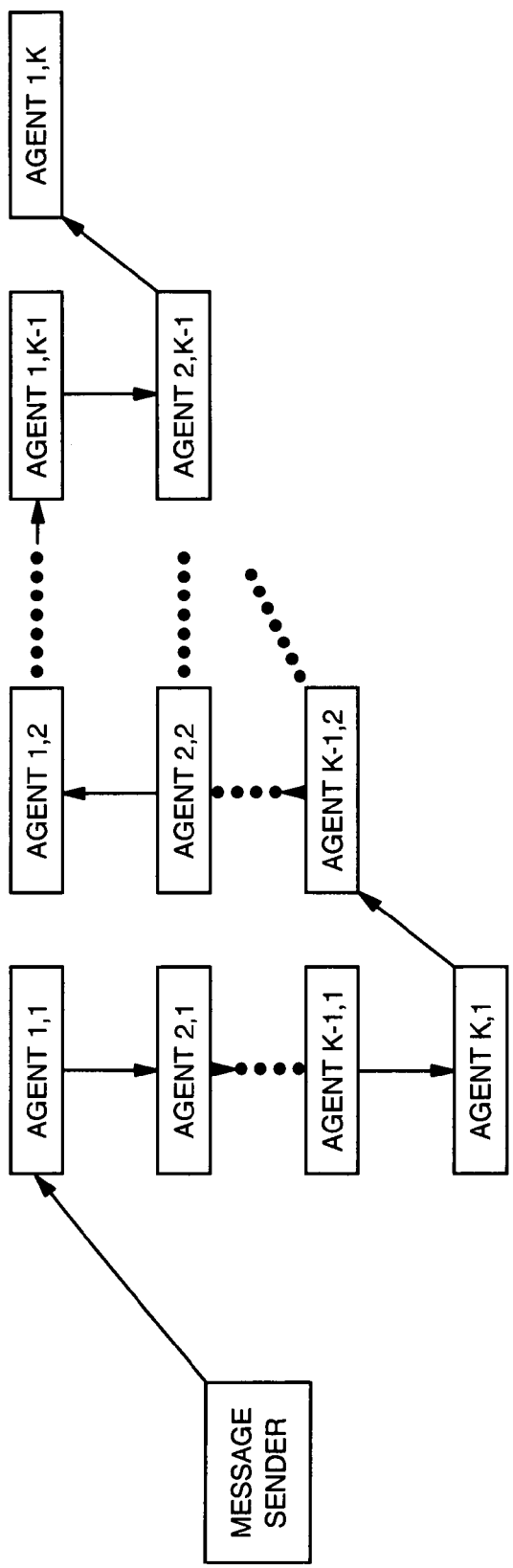

SYSTEM, METHOD AND PROGRAM PRODUCT FOR ANONYMOUS TRANSFER OF MESSAGES

FIELD OF THE INVENTION

The invention relates generally to message transfer, and more particularly to message transfer where the recipient of a message, such as a vote, should not know the identity of the sender of the message.

BACKGROUND OF THE INVENTION

Previously, secret communications were secured either by secret-key (also called symmetric key) cyphers, public key (also called asymmetric) encryption, or by a combination of them. Public key cryptography allows public keys to be distributed and even published while limiting the decryption (and signing) possibilities to the owner of the private key only. Secret key communication is more efficient computationally. Also, a specific type of secret key cryptography, known as one time pad, is unconditionally secure (from the cryptographic point of view) provided only that the key remains secret. The foregoing schemes ensure confidentiality of the messages. However in some situations, such as election systems or anonymous payment systems, not only the contents of the communication should be secured, but also the identity of each sender.

It is difficult to separate information about the sender from the contents of the message itself. Consequently, it is difficult to make the identity of the sender anonymous but the contents of the message available to the recipient and secret to an intermediate party.

In known symmetric encryption, a key is distributed securely to another participant and both participants keep a copy of the same key. The sender encrypts the message with the key and sends the encrypted message to the recipient. The recipient then decrypts the message with the key. In this scheme, the recipient knows the identity of the sender of the message. Consequently, if the message is a vote, the recipient would know the identity of the voter because the recipient has sufficient knowledge to make the link between the voter and his or her vote. One solution is to have intermediate agents between the sender and the recipient. Such a system based on public key cryptography is described in the article by David Chaum "Untraceable electronic Mail, Return Addresses, and Digital Pseudonyms" *Comm ACM* 24, 2, Feb. 1981, 84-88, wherein the author proposes to divide the recipients among different agents. For example, with two agents, the sender transmits his or her encrypted message encrypted with a series of public keys to one of the agents. This one agent decrypts the message with his or her private key only, and in turn sends the result to another agent without telling this other agent the identity of the sender.

The same strategy can be extended a system with many agents. This system will achieve anonymity provided all the agents do not collude, because intermediate agents can only pass on public keys to the sender, without being able to decrypt the messages. However, this system has the typical limitations of public key encryption:

this system lacks an unconditionally secure protocol (for elections this will be an argument).
this system is computationally demanding.
this system does not prevent vote buying, because a voter can prove his vote.
this system cannot be performed by humans only; it requires use of electronic devices in all circumstances.

If secret keys are used, there is still the problem of giving the sender the requisite keys such that the recipient does not know the identity of the sender but can decrypt the message while intermediate agents cannot. In this scheme, with two agents, a first agent gives a key to a second agent. Then, the second agent adds a key of his or her own and forwards the key to the message sender. The message sender then encrypts his or her vote twice, once with the key of the first agent and then re-encrypts the result with the key of the second agent. Finally, the message sender sends the message encrypted twice to the second agent. Because the second agent has sent both keys, he or she is able to decrypt the result with these two keys and make the link between the contents and the sender. This is a problem for secret key encryption and voting except when confidentiality can be ensured by other than cryptographic means.

In order to avoid the above problem, both agents could send their respective keys to the message sender separately. The sender would encrypt his or her message with both keys, and send the encrypted message to the first agent. The first agent would then decrypt the message with the first agent's key, and then forward the partially decrypted message to the second agent. The second agent would then decrypt the message with the second agent's key. At that time, the second agent could read the message, so the message is not private from the second agent. Thus, the second agent knows both the contents of the message (because the second agent decrypted it) and the identity of the sender (because the second agent had distributed the second agent's key to the sender earlier).

An object of the present invention is to enable anonymous communication of messages from senders to a recipient.

Another object of the present invention is to enable anonymous voting.

SUMMARY

The present invention resides in a system, method and program product for providing confidentiality of a combination of content of a message and a sender of the message. (The message can be a vote.) A final agent of the message provides a first encryption key to a first agent, interposed between the sender and the final agent. The first agent but not the final agent knows an identity of the sender. The final agent provides a second encryption key to a second agent, interposed between the sender and the final agent. The second agent knows an identity of the sender. The first agent generates a third encryption key and provides the first encryption key and the third encryption key to the sender. The second agent generates a fourth encryption key and provides the second encryption key and the fourth encryption key to the sender. The first agent receives from the sender a message encrypted with the first, second, third and fourth keys, and in response, decrypts the message based on the third key. Afterwards, the first agent provides the message decrypted based on the third key to the second agent. In response, the second agent decrypts, based on the fourth key, the message provided by the first agent. The message decrypted based on the third and fourth keys is provided to the final agent. In response, the final agent decrypts, based on the first and second keys, the message decrypted based on the third and fourth keys. There can be intermediary agents between the final agent and the first and second agents. Generally, there are multiple senders, and the interaction between the agents and each of the multiple senders is the same.

In accordance with features of the present invention, the first agent provides to the second agent a first index for the first key, and the second agent provides to the final agent a second index for the second key. The first agent provides to the second agent the first index along with the message decrypted based on the third key. The second index is provided to the final agent along with the message decrypted based on the third and fourth keys.

BRIEF DESCRIPTION OF THE FIGURES

FIG. 6 illustrates a message sent by a message sender of the embodiment of FIG. 5 and decryption performed by the intermediary agents in the K-1 columns.

DETAILED DESCRIPTION OF THE PREFERRED EMBODIMENTS

The present invention will now be described in detail with reference to the figures. As illustrated in the figures, intermediary agents, logically interposed between the message sender and the right most, final agent, are logically organized into rows and columns. The final agent can be or is closely associated with the final recipient of the message. As explained in more detail below, the sender encrypts the message with a combination of keys furnished directly or indirectly by both the final agent and each of the intermediary agents. The sender's message is processed serially by the intermediary agents and then the final agent, each of which decrypts the message based on a key or keys that that respective agent generated. The message remains encrypted to all the intermediary agents based on downstream intermediary agents, if any, and the keys furnished by the final agent. While the final agent can fully decrypt the message it receives from the most downstream intermediary agent, based on the keys generated by the final agent, the final agent does not know the identity of the sender. This is important in many applications, such as general elections where the message is a vote.

In the following description, the symbol "∘" indicates a symmetric encryption of a first part of the expression by a key in a second part of the expression. In one embodiment of the present invention, the encryption by the key is a simple addition, digit by digit, modulo ten. This has the advantage of being commutative. In this embodiment, the decryption is a simple subtraction modulo ten. However, the present invention applies to all encryptions that are commutative, for example the Xor function in the Vernam Cypher. Symmetric encryption that is not commutative (such as DES and AES) could also be used, but it would require the message sender to encrypt his or her messages using all the symmetric keys in the right order.

System with Three Agents

Figure 1:
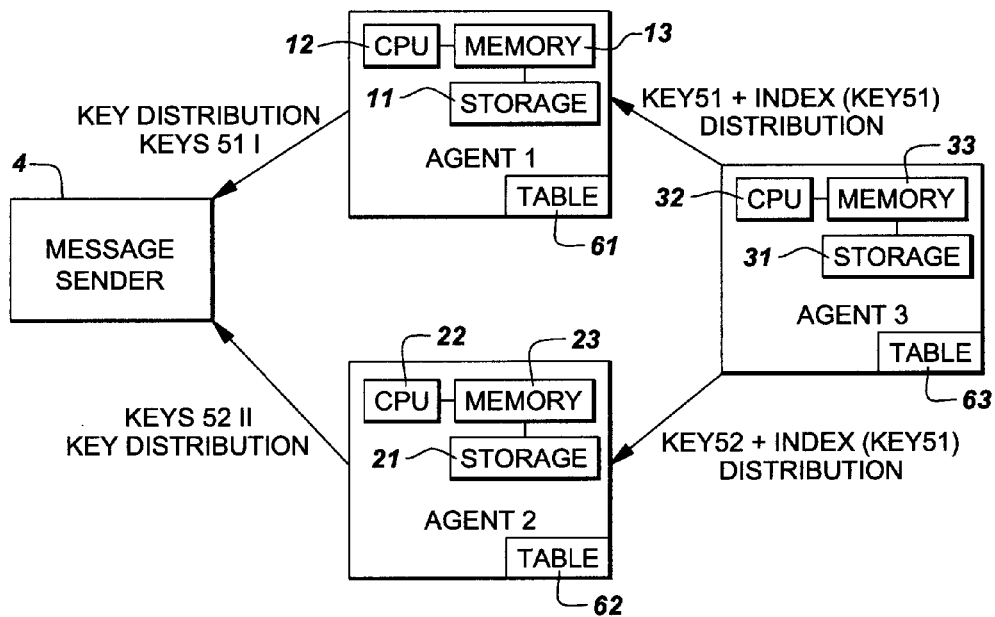
FIG. 1 illustrates distribution of keys from a final agent (called Agent 3) to a sender according to an embodiment of the present invention where there are three agents in total.

As illustrated in FIG. 1, agent 3 is the final agent of a message from a message sender (such as a citizen sending a vote). To prepare for the message, agent 3 distributes an encryption/decryption key 51 to agent 1 with a corresponding index that agent 3 records its own table 63 to reference key 51. To prepare for the message, agent 3 also distributes an encryption/decryption key 52 to agent 2 with a corresponding index that agent 3 records within table 63 to reference key 52. Agent 3 distributes the key 51 and corresponding index to agent 1 separately from the key 52 and corresponding index to agent 2, so agent 1 does not know the key 52 or corresponding index, and agent 2 does not know the key 51 or corresponding index. As explained in more detail below, this helps ensure confidentiality of the message subsequently sent by the message sender. After receipt of key 51, agent 1 combines (this can be addition, digit by digit modulo ten) its own randomly generated key I with key 51 received from agent 3, and then sends the resultant combination of keys separately to message sender/citizen 4. Agent 1 also updates a table 61 which records key I, correlates the identity of citizen 4 to key I, records the index for key 51 and correlates the index for key 51 also to the identity of the message sender/citizen. Likewise, after receipt of key 52, agent 2 combines (this can be addition, digit by digit modulo ten) its own randomly generated key II with key 52 received from agent 3, and then sends the resultant combination of keys separately to the message sender/citizen 4. Agent 2 also updates a table 62 which records key II, correlates the identity of citizen 4 to key II, records the index for key 52 and correlates the index for key 52 also to the identity of the message/sender citizen. (The agent in the right most column, for example agent 3, does not know, except if improper disclosure by an agent in the left most column, for example agent 1 or agent 2, the identity of the message sender/citizen 4. The identity of the message sender/citizen is known only to the agents in the left most column, for example, agents 1 and 2. If there were one or more middle columns of agents, such as agents D and E in the example of FIGS. 3 and 4, they would not know the identity of the message sender/citizen 4 except if improper disclosure by an agent in the left most column.) The following indicates the flow of keys and corresponding indexes:

Agent 3→Agent 1: Key51, indexKey51
Agent 3→Agent 2: Key52, indexKey52
Agent 1→Citizen: Key51I=Key51∘KeyI
Agent 2→Citizen: Key52I=Key52∘KeyII Thus, the message sender/citizen receives two combinations of keys, 51I and 52II, which each appear as one key, and need not know that each combination of keys is in fact a combination of keys from different agents. The message sender/citizen encrypts his or her outbound message with both combinations of keys, 51I and 52II. In one application of the present invention, the citizen's message will be the citizen's vote. The encrypted message can be represented by the following:

$$\text{Encrypted Vote}=\text{Vote}\circ\text{Key51I}\circ\text{Key52II}=\text{Vote}\circ\text{KeyI}\circ\text{Key51}\circ\text{KeyII}\circ\text{Key52} \quad 1.(a)$$

Figure 2:
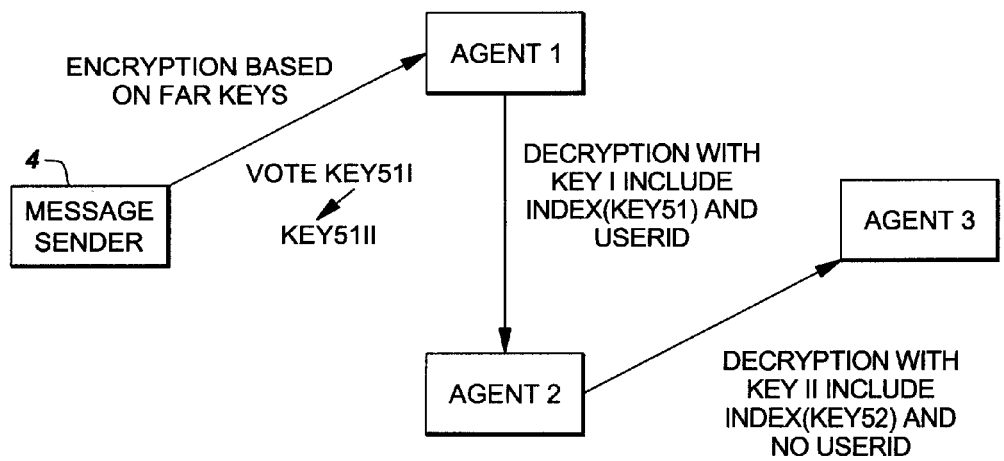
FIG. 2 illustrates a message sent by a message sender of the embodiment of FIG. 1 and decryption performed by the two intermediary agents.

The outbound message flow and its serial decryption is illustrated in FIG. 2. First, the message sender/citizen sends his or her encrypted vote to agent 1 along with an identity of the citizen, as represented by equation 1.(a). Agent 1 will decrypt the message using agent 1's self generated key I, only, append the index of key 51, and send the result together with the identification of the citizen, to agent 2. (Agent 1 knows to decrypt using key I because agent 1 has a table which correlates the identity of citizen 4 to key I.) Agent 2 will decrypt the message using agent 2's self generated key II only, append the index of key 52, delete the identification of the message sender/citizen, and send the result to agent 3. (Agent 2 knows to decrypt using key II because agent 2 has a table which correlates the identity of citizen 4 to key II.) Agent 3 will look up the keys, key 51 and key 52, using the indexes (for keys 51 and 52) in the message from agent 2, and then decrypt the final message using keys 51 and 52. Agent 3 does not know the identity of the message sender/citizen 4, either from the message or otherwise. The foregoing message and key flow is represented by the following equations:

Citizen→agent1: Vote°Key51°KeyI°Key52°KeyII, and also citizen identification (without encryption/in clear).

agent1→agent2: Vote°Key51°Key52°KeyII, and also citizen identification and index for key 51 (without encryption/in clear).

agent2→agent3: Vote°Key51°Key52, index Key51, and index Key52, without citizen identification.

Thus, the combination of (plain text) vote and the identity of the voter remains confidential if any two of the three agents protect their data properly. Any other agent could publish all of its data, i.e. its received vote, its self-generated key and key received from agent 3, in the case of agents 1 and 2, and fully decrypted vote in the case of agent 3) without compromising confidentiality of the combination of (fully decrypted) vote and identity of the voter. Thus, even the case where one agent breaches all its confidentiality, the confidentiality of the combination of vote and identity of the voter can still be protected by the other two agents.

The agents 1, 2 and 3 should be chosen for their security infrastructure, as well as their reputation for confidentiality and non-collusion. A way to convince the public of the anonymity of the vote is to place all agents in one place, in the presence of a sufficient number of auditors and seal the hardware used in the vote transmissions or erase the votes when appropriate.

System with Six Agents

Figure 3:
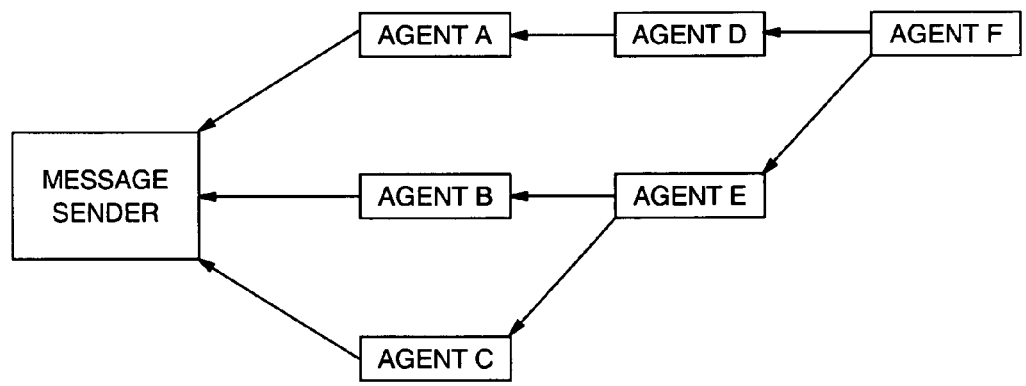
FIG. 3 illustrates distribution of keys from a final agent (called Agent F) to a sender according to another embodiment of the present invention where there are six agents in total.

FIG. 3 illustrates how the keys are distributed and used in an example model with six agents. FIG. 3 shows a matrix comprising three rows and three columns of agents. The explanation of FIG. 3 is analogous to the explanation for the previous embodiment of FIGS. 1 and 2 with three agents. With reference to FIG. 3, the flow of keys and indexes to the message sender (called "citizen" in the application where the message is a vote) is represented by the following equations:

Agent f→agent d: Key_fd, indexKey_fd.

Agent f=>Agent e: Key_fe, indexKey_fe

Agent d=>Agent a: Key_fd°Key_da, indexKey_da

Agent e=>Agent b: Key_fe°Key_eb, indexKey_eb

Agent e=>Agent c: Key_fe°Key_ec, indexKey_ec

Agent a=>Citizen: Keya=Key_fd°Key_da°Key_a

Agent b=>Citizen: Keyb=Key_fe°Key_eb°Key_b

Agent c=>Citizen: Keyc=Key_fe°Key_ec°Key_c where

Key_xy: key that is sent or was sent from agent x to agent y.
IndexKey_xy: index of Key_xy in the table of x, sent together with Key_xy to agent y.

The message sender/citizen receives Key_fe twice, once through agent b and once through agent c. That is why in the decryption phase, each agent that received a key that afterwards was duplicated by another agent, should remove the redundant keys and send the message encrypted only once with that key, to the next agent in the column.

Figure 4:
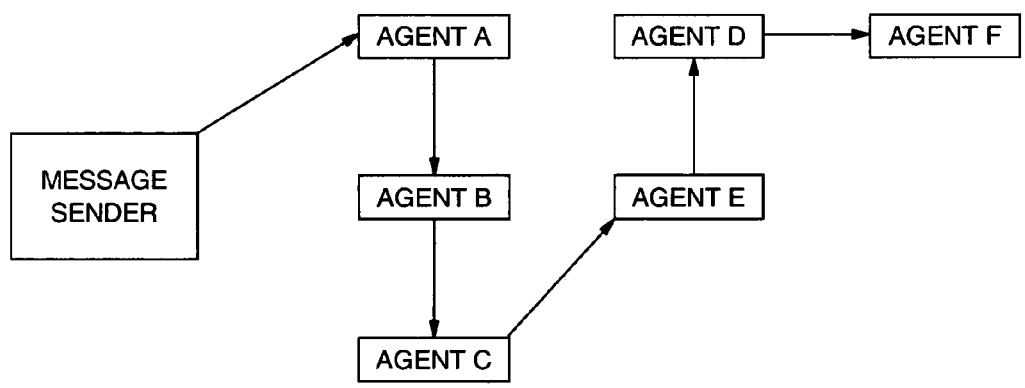
FIG. 4 illustrates a message sent by a message sender of the embodiment of FIG. 3 and decryption performed by the five intermediary agents.

FIG. 4 shows how a message outbound from the message sender/citizen is decrypted in the example involving six agents. The explanation is analogous to what is described under the first embodiment involving three agents. The message flow with associated keys is represented by the following equations:

Citizen→agent a: Vote°Keya°Keyb°Keyc°, and also citizen identification.

Agent a→agent b: Vote°Key_fd°Key_da°Keyb°Keyc, indexKey_da, and also citizen identification.

Agent b→agent c: Vote°Key_fd°Key_da°Key_fe°Key_eb°Keyc, indexKey_da, indexKey_eb and also citizen identification.

Agent c→agent e: Vote°Key_fd°Key_da°Key_fe°Key_eb°Key_fe°Key_ec, indexKey_da, indexKey_eb, indexKey_ec (without citizen identification).

Agent e→agent d: Vote°Key_fd°Key_da°Key_fe,indexKey_da, indexKey_fe.

It was necessary for agent e to decrypt once with Key_fe. This is because the message passed to agent e contained encryption twice with the same key Key_fe. If the agent e had left this unchanged, this would have allowed agent d to learn something about the vote; one example is when addition modulo two (the Xor) is used as encryption. In that case, "Key_fe°Key_fe" is always zero; thus agent d would receive just "Vote°Key_fd", and because agent d knows Key_fd, agent d would be able to decrypt the vote before it arrives at agent f.

Note that agent e removed indexes indexKey_eb, indexKey_ec from the message.

Agent d→agent f: Vote°Key_fd°Key_fe, indexKey_fe, index_fd.

Note that agent d removed indexKey_da from the message.

Agent f can look up all the keys in the expression above, and therefore, agent f can decrypt the message and learn the vote.

System with More than Six Agents

Figure 5:
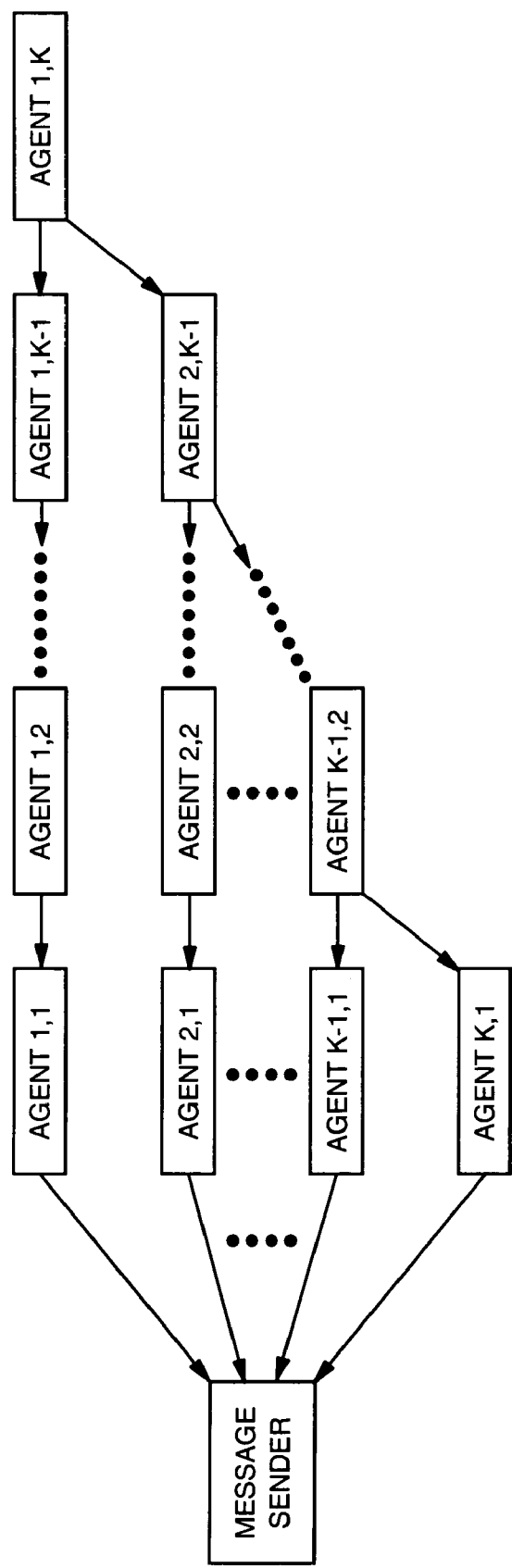
FIG. 5 illustrates distribution of keys from a final agent (called Agent 1, K) to a sender according to an embodiment of the present invention where there are K-1 columns of intermediary agents.

A system with more than six agents is generally illustrated in FIG. 5, where "i" represents a row of an agent, "j" represents a column of an agent, and "k" is the total number of columns, i.e. b $1 \leq i$, $j \leq k$. Thus, all agents are represented by an index (i, j). Agents represented by the index (i,j) where k−j+1 is smaller than i are not needed for security and can be omitted. This omission was appropriate for efficiency, as indicated by the following example. If an agent at position (k, k−1) colludes directly with the final agent of the message ("agent" at position (1,k)), this would render all agents below agent at position (1,k) almost useless for purposes of security. Consequently, the optimum matrix of agents will typically have a "triangular" shape where each column j has one less agent than the column j−1.

Each agent i,j will randomly generate a respective key, and pass its randomly generated in combination with a key it receives from upstream agent(s) to its downstream neighbor agent i,j−1. (All agents except agent 1,k will receive a key from an upstream agent.) If an agent in column j−1 is located in a row beneath the last row of column j, then the agent in the last row of column j passes its combination of keys to two agents in column j−1, the agent in the same row and the agent in the lowest row in column j−1.

FIG. 5 illustrates how keys and indexes are forwarded to the message sender/citizen. In the triangular matrix in FIG. 5, there is only one agent in the rightmost column, namely agent 1,k. The bottom agent of that rightmost column (which, as already mentioned, is agent 1,k), will randomly generate another key, and pass it through agent i+1, k−1, which, in the triangular matrix, will be agent 2, k−1. The keys are delivered together with their indexes. Note that further to the rightmost agent/final message recipient, there are a number of (k−1)(k+2)/2-intermediate agents. Each agent i,j with j different than 1 and k will:

1) receive the Key (i, j+1) and Index (i,j+1), from his or her neighbour agent i, j+1, and store the received Index (i,j+1).
2) randomly generate a new key Key*(i,j)
3) attribute an Index (i,j) to Key*(i,j) and store the index.
4) add Key*(i,j) to Key (i,j+1), and pass the resulting Key (i,j)=Key(i,j+1) °Key*(i,j) to agent i, j−1 together with the index Index(i,j) of that key.

Also, in the triangular matrix, the bottom agent will randomly generate another key, and pass it through to agent i+1, j−1 as described in steps 2) to 4) above. Each agent i,j with j=1 will:

perform the steps 1) to 3) above.
map the Index(i,j), which will be Index(i,2), to an identification of the message sender/citizen, or to a serial number that ultimately will be mapped to a message sender/citizen.
add Key*(i,1) to Key(i,2), and pass the resulting Key(i,1)=Key*(i,1) °Key(i,2) to the message sender/citizen in a secure and authenticated way.

FIG. 6 illustrates how an outbound message from the message sender/citizen is forwarded to the rightmost agent/final agent, agent 1,K, and decrypted along the way with the same agents as in FIG. 5. For the leftmost column (the entities having delivered their keys directly to the message sender/citizen), in other words each agent i,j with j=1 will:

use the identification of the citizen to look up Key*(i,j).
decrypt the encrypted message with Key*(i,1) only.
use the identification of the citizen to look up the index of the agent at column 2 that passed the key to him or her in the key distribution phase (mostly this will be Index(i, 2)).
append the looked up index to the message.
pass the resulting message to the next agent in the column or, if arrived at the end of the column, delete the citizen identification and pass the resulting message to an agent in the second column (from the left).

Each agent i,j with j different than k and 1 will:
extract the Index(i,j) from the message, to look up Key*(i, j).
decrypt the encrypted message with Key*(i,1) only.
if and only if the agent had sent specific keys to two agents of column j−1, repeat the two steps above with the second Index(i,j) received.
use the Index(i,j) to look up the index of the agent at the next column j+1, that passed the key to him in the key distribution phase (mostly this will be Index(i,j+1)).
append the looked up index (for agent in column j+1) to the message.

delete Index(i,j) from the message.
if and only if the agent had sent specific keys to two agents of column j−1, then decrypt the message once with the key received from column j+1, in order to avoid passing messages that have been encrypted twice with the same key, as explained above.
pass the resulting message to the next agent in the column or, if arrived at the end of the column, pass the resulting message to an agent in the next column j+1.

Each agent i,j with j=k will do the following: (In the triangular matrix in FIG. 6 there is only such agent, namely agent 1,k.)

extract Index(i,k) from the message to look up Key*(i,k).
decrypt the encrypted message with Key*(i,k).
if the agent had sent specific keys to two agents of column k−1 (which is the case in a triangular matrix) repeat the two steps above with the other Index(i+1,k), and retrieve the plain text message such as a vote.

Requirements of Intermediary Agents

To be reliable, the system according to the present invention, must prevent a correlation, by unauthorized entities, between a plain text (i.e. unencrypted) message and the identity of its sender. The following explains which combinations of collusions of agents destroys the requisite confidentiality of the combination of unencrypted message and message sender, i.e. allows correlation of the sender of a message with the plain text message. Although, the system being used to illustrate these combinations has six total agents (including the final agent), the same principle could be extended to a system with any number of agents. In FIGS. 7A-F, there is collusion between the agents shown in bold boxes, and some of these combinations of collusions, as indicated below, destroys the requisite confidentiality.

Figure 7A:
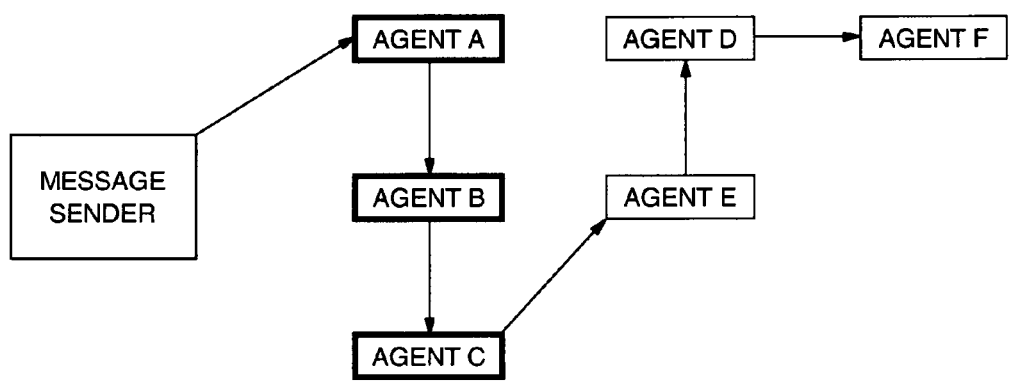
FIGS. 7A to 7F illustrate the system of FIG. 3 involving six agents wherein there is a collusion between various combinations of agents shown in bold.

In FIG. 7A, there is a collusion between all the agents of the left most column. The agents in this leftmost column all know the identity of the message sender/citizen. Also, the agents in the leftmost column together know all the keys sent to the message sender that were used to encrypt the message. Therefore, together the agents in the leftmost column are able to decrypt the message and identify the sender of the message. Therefore, the combination of collusions illustrated in FIG. 7A destroys the requisite confidentiality of the combination of message sender and decrypted message.

Figure 7B:
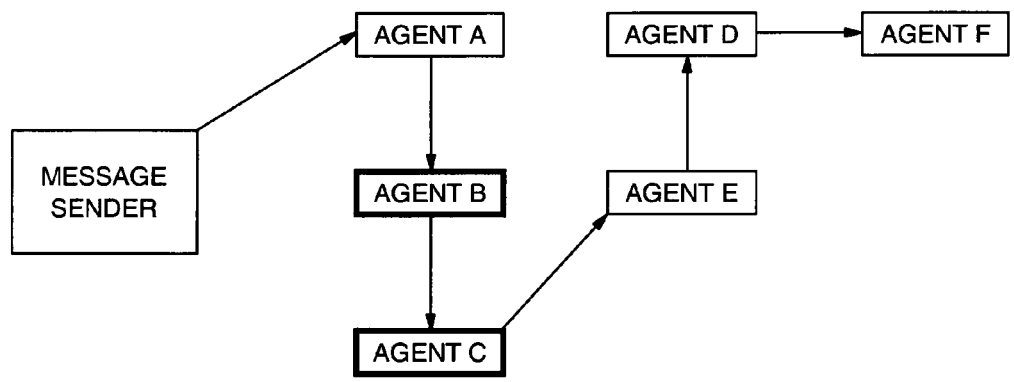

In FIG. 7B, there is a collusion between all the agents but one (i.e. collusion between agents B and C) of the leftmost column. Both agents B and C know the identity of the message sender/citizen. However, the colluding agents B and C still lack the remaining key, known only to agents A, D and F, needed to decrypt the message. Consequently, the combination of collusions illustrated in FIG. 7B does not destroy the requisite confidentiality of the combination of message sender and decrypted message.

Figure 7C:
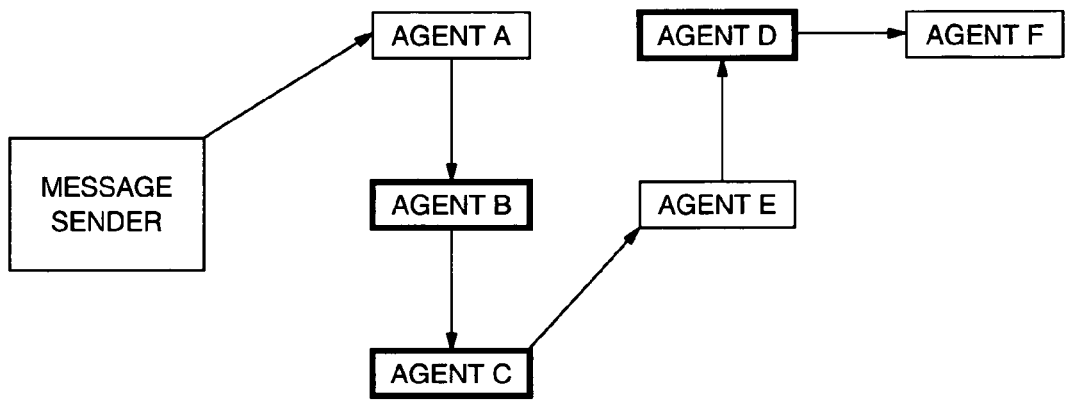

In FIG. 7C, there is a collusion between all but one of the leftmost agents (i.e. collusion between agents B and C in the second and third rows) and an agent in another column in the same row as the sole, noncolluding agent in the leftmost column (i.e. agent D in the first row). In the leftmost column, both agents B and C know the identity of the message sender. Each agent B and C also knows the keys that it has received and passed to the message sender. These keys are associated with the second and third rows. The agent D in the first row of an another column knows what key he or she received from agent F and sent to the agent A in the first row of the left most column. While none of the agents B, C or D knows the key generated by agent A and sent to the message sender for encryption of the message, agent A will decrypt the message with this key before passing the message to agent B. So, it is not necessary for the colluding agents B, C or D to know the key generated by agent A. Because there is a colluding agents in all the rows of all leftmost agents (even though they are in different columns), together all the colluding agents know all the keys needed to decrypt the message that they receive, as follows:

agent b brings in Key_fe°Key_eb,
agent c brings in Key_fe°Key_ec,
agent d brings in Key_fd°Key_da,
Agent c sends to agent e the following information:
Vote°Key_fe°Key_eb°Key_fe°Key_ec°Key_fd°Key_da,
so they can use what they brought in to decrypt and get the message/vote. Because agent B and agent C know the identity of the citizen, know the index used by D, and communicate with D who knows the decrypted message, they can make the correlation between the decrypted message/vote and the citizen. Therefore, the combination of collusions illustrated in FIG. 7C destroys the requisite confidentiality of the combination of citizen and plain text vote/message.

Figure 7D:
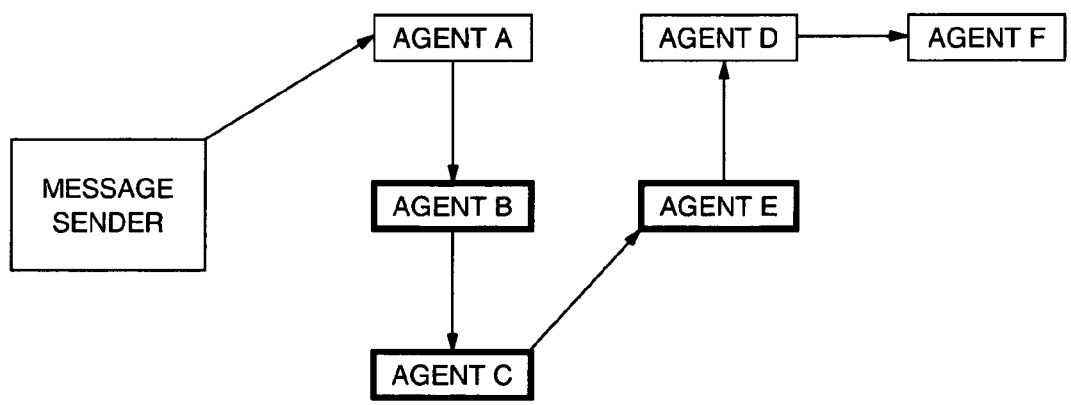

In FIG. 7D, there is a collusion between all but one of the leftmost agents (i.e. collusion between agents B and C in the second and third rows) and the agent E in the second row (i.e. at position (m,2) where (m,1) is the position of one of the colluding leftmost entities). Both agents B and C will know the identity of the message sender. However, there is still a full row of agents (i.e. the first row in the illustrated example) who have not colluded and at least one agent (i.e. agent D in the illustrated example) who has not legitimately decrypted the message with its self generated key prior to the last colluding agent). Also the key previously supplied by agent F to agent D is not known to any of the colluding agents. So, at all times, the message will remain encrypted with respect to the colluding entities with either Key_fd°Key_da or Key_da, despite encryption based on the keys known to the colluding agents. Consequently, the combination of collusions illustrated in FIG. 7D does not destroy the requisite confidentiality of voter and plain text message.

Figure 7E:
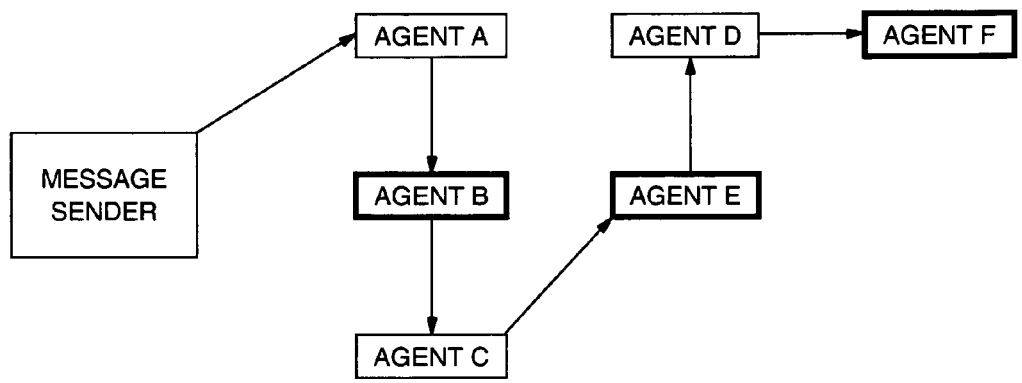

In FIG. 7E, the agents in a complete row have colluded. So, the link between the message sender and its message can be made via the indexes, as follows. The indexes agent F gets from agent D are the indexes that agent F previously sent to agent D (called indexKey_fd) and to agent E (called indexKey_fe). Because agent B and agent E both collude with agent F, then agent F can provide those indexes to agent E. Agent E can then look up the corresponding indexKey_eb, which agent F did not have, and communicate it to agent B. Agent B is then able to identify the message sender. Therefore, the combination of collusions illustrated in FIG. 7E destroys the requisite confidentiality of the combination of voter and plain text vote.

Figure 7F:
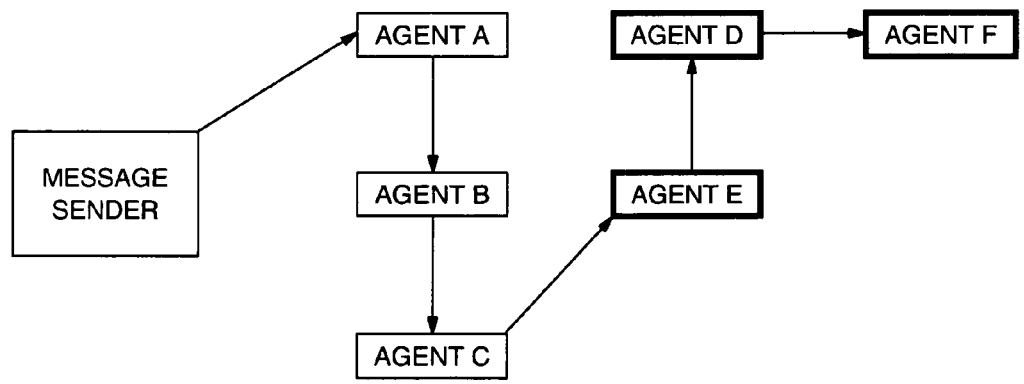

In FIG. 7F, all agents except those of the leftmost column have colluded. Agent F will receive the message decrypted with all the keys except those generated by agent F. Agent D will supply all the indexes for the keys generated by agent D. But, none of the agents E, D or F knows the identity of the message senders, so no link can be made between the plain text message (such as a vote) and the identity of the message sender. Therefore, the combination of collusions illustrated in FIG. 7F does not destroy the requisite confidentiality of the combination of message sender and plain text message.

As noted above, only some of the agents are in contact with and know the identifies of the message senders. Also, all the keys are not known to all the agents. Symmetric keys can be used. Also, no one (breaching) agent can sacrifice the confidentiality of the combination of the plain text message and the identity of the message sender. Even some combinations of agents, depending on the total number of agents and the logical arrangement of agents, cannot sacrifice this confidentiality. This makes the present invention effective for "real-time" (as opposed to only batch) anonymity of messages.

Embodiment for General Elections

Figure 8:
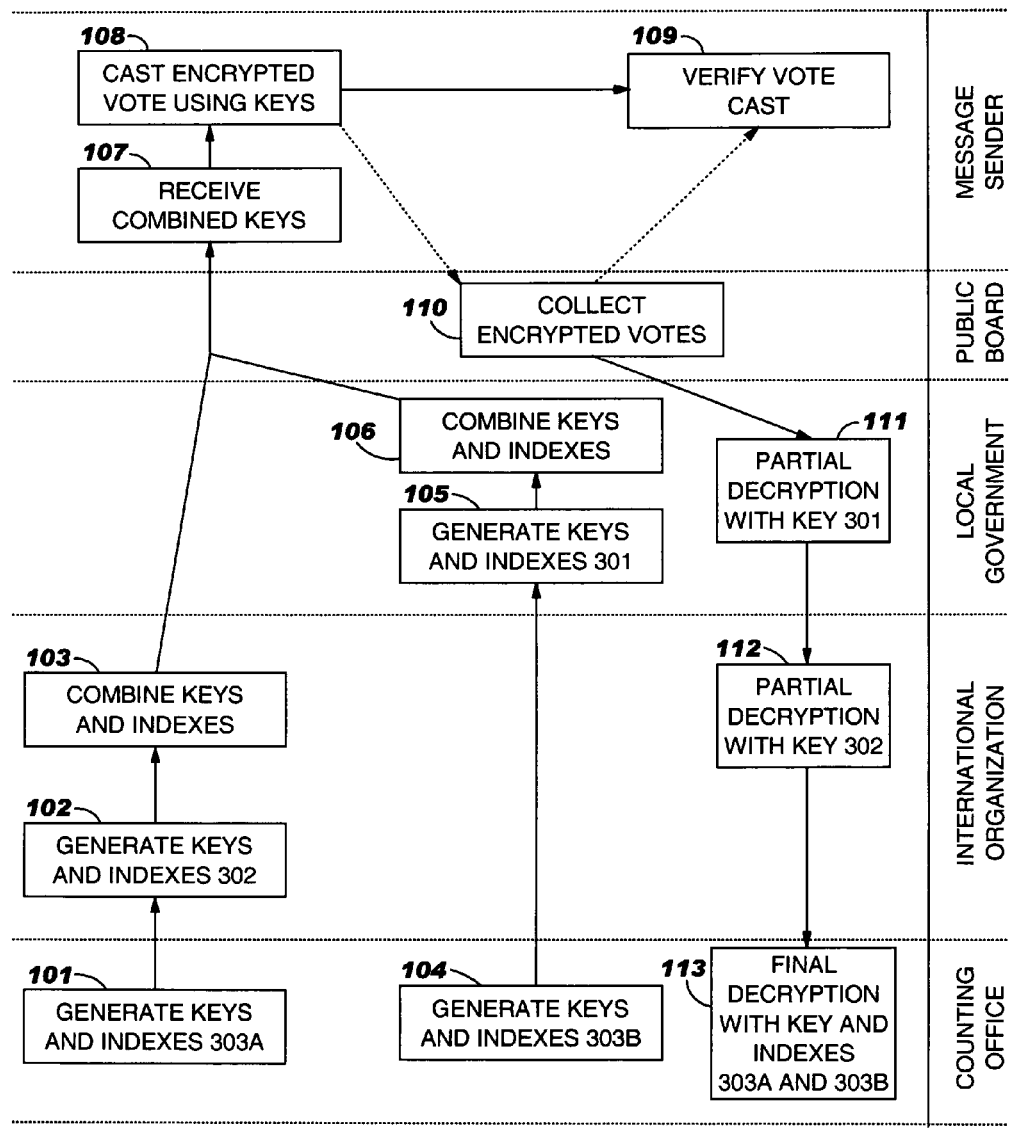
FIG. 8 illustrates a three agent embodiment of the present invention used for transferring votes in general elections.

The schema for using the present invention in general elections, illustrated in FIG. 8, involves three steps:
distribution of keys (from the final agent to the message sender via intermediary agents) according to the matrix described above,
encryption and sending of the votes by the voter/message sender (via the intermediary agents to the final agent/recipient),
decryption of the vote by each intermediary agent according to the matrix described above.

One way to generate secret keys is to generate them randomly. In order to increase confidence, several series of keys could be generated and sealed, cryptographically and/or physically. Several auditors could then jointly randomly select which one of the series will be finally sent. This series should then be kept secret, while the other series will be opened/published for verification. Sending of the keys can be done via untappable channels such as sealed paper or they can be loaded on smart cards, including Java Cards. Sealed paper could contain appropriate coating in order to allow the message sender to verify that the secret key has not been disclosed yet. In order for a voter to avoid being able to prove his or her vote, several keys could be sent to him/her on a pile of loose sheets, only one of which would contain the correct key. On a separate sheet, one would indicate which of the sheets contains the correct key. All this could be sent in one or more sealed envelopes. Because the sheets can be shuffled at any time, it is not possible for someone to prove his or her vote (which is an advantage), unless the coercer is physically present from the moment the sealed envelope is opened. The voter can encrypt his or her vote either via one time pad or via other symmetric encryption techniques. Then, the voter sends his or her encrypted vote with authentication to the first agent. Note that the encrypted vote may be published to allow the voter to verify that the vote arrived correctly. The decryption can be done either by letting the messages flow through agents assembled in one place which is intensively monitored by a sufficient number of auditors. Alternately, the decryption can be done as follows for the example with three agents. Agent 1 and agent 2 will reside at the voting office, and agent 3 will reside at the counting office. The information flowing through the agents should remain secret and valid. This can be ensured by use of sealed data carriers such as physically sealed CD-ROMS. When the hardware is left unmonitored, it can be sealed too, in order to prevent anyone from modifying or reading the data/votes. In the following example, there are three agents or agents, the counting office (agent 1), an international organization (agent 2) and the local government (agent 3) and a public board for controlling the encrypted votes by the voters.

Step 101:

The counting office generates randomly and secretly keys and indexes 3a which can be used in case of five voters:

| Key 303a | Index 303a |
|---|---|
| 3 | 1 |
| 0 | 2 |
| 7 | 3 |
| 9 | 4 |
| 8 | 5 |

The counting office stores and seals this table on a non modifiable data carrier, and sends a copy to the international organization. A non modifiable data carrier can include printing on paper in a sealed format, or storing on a CD-ROM and sealing it afterwards.

Step 102:

The international organization generates randomly and secretly its own keys and indexes 302:

| Key 302 | Index 302 |
|---------|-----------|
| 5 | 1 |
| 5 | 2 |
| 1 | 3 |
| 0 | 4 |
| 3 | 5 |

The international organization stores and seals this table on a non modifiable data carrier.

Step 103:

The international organization then combines a mix of its own keys to the table received (mixed or not mixed) from the counting office, as follows:

Mixed table international organization+table counting office (also mixed here)=

| Key 302 | Index 302 | | Key 303a | Index 303a | | Index 302 | Keys 302 + 303a | Index 303a |
|---------|-----------|---|----------|------------|---|-----------|-----------------|------------|
| 1 | 3 | + | 9 | 4 | = | 3 | 0 | 4 |
| 5 | 2 | | 7 | 3 | | 2 | 2 | 3 |
| 3 | 5 | | 3 | 1 | | 5 | 6 | 1 |
| 5 | 1 | | 8 | 5 | | 1 | 3 | 5 |
| 0 | 4 | | 0 | 2 | | 4 | 0 | 2 |

This last table will be prepended ultimately with identifications of final message senders, as shown in following example:

| Voters | Index 302 | Keys 302 + 303a | Index 303a |
|--------|-----------|-----------------|------------|
| → Mme Janssens | 3 | 0 | 4 |
| Mr Peeters | 2 | 2 | 3 |
| Mr Grosjean | 5 | 6 | 1 |
| Mme PetitBois | 1 | 3 | 5 |
| Mme Van Peteghem | 4 | 0 | 2 |

In mayor implementations, the indexes 302 will play the role of serial numbers, in order to cope with message senders that loose their key. In those implementations, the number of generated keys will be greater than the number of message senders; each message sender will be associated with a serial number. If the message sender looses his or her key, he or she will be associated with another serial number.

Now the keys will be sent to the message senders. In order to do this, the keys can for example be sent printed in a sealed and authenticated envelope, or for example a smart card can be issued with the key on it.

Mme Janssens will get "key: 0" from the international organization.

Mr Peeters will get "key: 2" from the international organization.

Mr Grosjean will get "key: 6" from the international organization.

Mme Petitbois will get "key: 3" from the international organization.

Mme Van Peteghem will get "key: 0" from the international organization.

From the data shown above in this step, the column Keys 302+303a may be deleted. The other data should be stored on a sealed and non modifiable data carrier.

Step 104:

The counting office generates randomly and secretly the keys and indexes 303b:

| Key 303b | Index 303b |
|----------|------------|
| 4 | 1 |
| 1 | 2 |
| 8 | 3 |
| 2 | 4 |
| 8 | 5 |

The counting office stores this table safely and sends a copy to the local government.

Step 105:

The local government generates randomly and secretly on its own keys and indexes 301:

| Key 301 | Index 301 |
|---------|-----------|
| 4 | 3 |
| 4 | 2 |
| 1 | 1 |
| 8 | 4 |
| 7 | 5 |

Step 106:

The local government then combines a mix of its own keys to the table received from the counting office (mixed or not mixed), as follows:

Table of local government+table of counting office=

| Key 301 | Index 301 | | Key 303b | Index 303b | | Index 201 | Keys 301 + 303a | Index 303b |
|---------|-----------|---|----------|------------|---|-----------|-----------------|------------|
| 4 | 3 | + | 2 | 4 | = | 3 | 6 | 4 |
| 4 | 2 | | 8 | 3 | | 2 | 2 | 3 |
| 1 | 1 | | 8 | 5 | | 1 | 9 | 5 |
| 8 | 4 | | 1 | 2 | | 4 | 9 | 2 |
| 7 | 5 | | 4 | 1 | | 5 | 1 | 1 |

This last table will be prepared ultimately with identifications of final message senders, as shown in following example:

| Voters | Index 301 | Keys 301 + 303a | Index 303b |
|---|---|---|---|
| → Mme Janssens | 3 | 6 | 4 |
| Mr Peeters | 2 | 2 | 3 |
| Mr Grosjean | 1 | 9 | 5 |
| Mme PetitBois | 4 | 9 | 2 |
| Mme Van Peteghem | 5 | 1 | 1 |

Again, the indexes Index 301 can be used as serial numbers, as described above under step 103.

Now the specific keys will be sent to the message senders, as described above under step 102.
  Mme Janssens will get "key: 6" from the local government.
  Mr Peeters will get "key: 2" from the local government.
  Mr Grosjean will get "key: 9" from the local government.
  Mme Petitbois will get "key: 9" from the local government.
  Mme Van Peteghem will get "key: 1" from the local government.

From the data shown above in this step, the column Keys 301+303*a* may be deleted. The other data should be stored on a sealed and non modifiable data carrier.

Step 107.

The message sender gets the keys as described at the end of step 103 and step 106. For example, Mme Janssens will have received "key=0" from the international organization, and "key=6" from the local government.

Step 108.

The message sender remotely computes his/her encrypted vote. Let's have four candidates:
  1. Jan Jannsen
  2. Peter Persen
  3. Bernard Bernardsen
  4. Julie Junesco Mme Janssens, Mr Peeters and Mr Grosjean want to vote for candidate number two, Peter Persen. The other two voters for candidate number four, Julie Junesco.

If using a PC, Mme Janssens logs on to a web page (containing a javascript), selects candidate number two, and enters the two keys she received, plus information that authenticates her. The javascript locally computes two (for the candidate) plus zero (the key coming from the international organization), plus six (the key coming from the local government) modulo ten, which yields eight. "Eight" is Mme Janssens's encrypted vote, which she submits to the public bulletin board web site.

Mr Peeters does not have access to a PC. He computes his vote manually:

2+2+2 modulo ten=6

Mr Peeters accesses a simple phone (voice Response) application, authenticates (using one-time password and/or a voice print), and transmits his encrypted vote of "6".

Mr Grosjean doesn't have access to a PC either. He computes his vote manually:

2+6+9 modulo ten=7

Mr Grosjean sends an SMS containing his Message sender Id and a one time password, followed by the encrypted vote of "7".

Mme Petitbois uses a PC to cast her vote like Mme Janssens, after authentication she submits:

4 (number of the candidate)+3+9 modulo ten=6

Mme Van Peteghem also uses a PC to cast her vote, after authentication she submits:

4 (number of the candidate)+0+1 modulo ten=5

The Voice Response system, the web site and the SMS gateway all update the same public bulletin board.

Step 109 and 110

The public bulletin board collects following votes:

| Message senders | Encrypted Votes |
|---|---|
| Mme Van Peteghem | 5 |
| Mme PetitBois | 6 |
| Mr Grosjean | 7 |
| Mme Janssens | 8 |
| Mr Peeters | 6 |

The citizens can verify that the encrypted vote has been listed correctly in a variety of ways: web site, voice server, request by SMS. Authentication in order to verify that, is not essential here.

Step 111

At the local government's premises, the keys 301 are looked up.

For Mme van Peteghem: index 201=5=>key 301=7.
  5 (the encrypted vote)−7 (the key) modulo ten=8. "Eight" is the partially decrypted vote.

The local government also looks up that the Index 303*b*=1 for Mme van Peteghem. So, for Mme Van Peteghem, it will store following data:
  Mme Van Peteghem, 8, Index 303*b*=1

Likewise, it will store following data for the other voters:
  Mme Petitbois, 8, Index 303*b*=2
  Mr Grosjean, 6, Index 303*b*=5
  Mme Janssens, 4, Index 303*b*=4
  Mr Peeters, 2, Index 303*b*=3

Result: the local government sends the data below secretly to the international organization:

| Mme Van Peteghem | 8, Index 303b = 1 |
|---|---|
| Mme PetitBois | 8, Index 303b = 2 |
| Mr Grosjean | 6, Index 303b = 5 |
| Mme Janssens | 4, Index 303b = 4 |
| Mr Peeters | 2, Index 303b = 3 |

Note that the local government does not know anything about the vote intentions. Even the partially decrypted votes remain unbreakably encrypted for the local government. Some of the keys for which the partially decrypted messages remain encrypted, are the keys 303*a*. The local government never had access to the keys 303*a*.

Step 112

At the international organization's premises, the keys 302 are looked up.

For Mme van Peteghem: index 2=4=>key 302=0
  8 (the partially decrypted vote from the local government)−0 modulo ten=8. "Eight" is the partially decrypted vote after decryption by the international organization. Looking in its stored tables, the international organization also found that: Index 303a=2

Result: the international organization will send to the counting office for Mme van Peteghem the message
  8, Index 303b=1, Index 303a=2
  without mentioning her name, and mixing the order of the messages, so that the identity of the voter cannot be deduced by looking at the row number.

The way the rows are mixed, is also stored on a non modifiable data carrier and sealed, for auditing purposes afterwards.

Here is an example of such a mix for the international organization:

| Name | Old row nr | New row nr |
| --- | --- | --- |
| Mme Van Peteghem | 1 | 4 |
| Mme PetitBois | 2 | 2 |
| Mr Grosjean | 3 | 1 |
| Mme Janssens | 4 | 3 |
| Mr Peeters | 5 | 5 |

After that mix, the international organization sends to the counting office the following messages:

```
3, Index 303b = 5, Index 303a = 1 (from Mr Grosjean but
   without mentioning)
3, Index 303b = 2, Index 303a = 5 (from Mme Petitbois
   but without mentioning)
3, Index 303b = 4, Index 303a = 4 (from Mme Janssens but
   without mentioning)
8, Index 303b = 1, Index 303a = 2 (from Mme Van Peteghem
   but without mentioning)
7, Index 303b = 3, Index 303a = 3 (from Mr Peeters but
   without mentioning)
```

Note that the international organization does not know anything about the vote intentions either. Even the partially decrypted votes remain unbreakably encrypted for the international organization. It knows the index 303b now, but not the key 303b itself.

Step 113

The above messages arrive at the counting office without the names appended.

For the first message, the counting office looks up the key at Index 303b=5, which is 8. Then it looks up the key at Index 303a=1, which is 3.

3−8−3 modulo 10=2

Likewise, the other messages generate:

3−1−8 modulo 10=4

3−2−9 modulo 10=2

8−4−0 modulo 10=4

7−8−7 modulo 10=2

So the vote intentions are decrypted, without anyone knowing who voted for what.

Before publishing the above final results, the rows are mixed randomly again. If for example the mixing is as follows:

| Old row nr | New row nr |
| --- | --- |
| 1 | 5 |
| 2 | 3 |
| 3 | 1 |
| 4 | 2 |
| 5 | 4 |

Then the above mixing table will be stored secretly and the finally released decrypted votes will be:

| New row nr | Decrypted vote |
| --- | --- |
| 1 | 2 |
| 2 | 4 |
| 3 | 4 |
| 4 | 2 |
| 5 | 2 |

In general, the keys, indexes and each partial decryption step, as well as the data about each mixing, is written on a non-modifiable and sealed data support, to allow auditing afterwards.

Step 114

The above messages are counted and generate following result:
  1. Jan Jannsen: 0 votes
  2. Peter Persen: 3 votes
  3. Bernard Bernardsen: 0 votes
  4. Julie Junesco: 2 votes Auditing can be done by choosing randomly whether to:
  reveal to auditors that do not have access to data at the international organization nor at the counting office:
    the keys Key 301 and indexes stored at the local government
    the message sent to the international organization or
  reveal to auditors that do not have access to data at the local government nor at the counting office:
    the message received from the local government
    the keys Key 302 and indexes stored at the international organization
    the mixing table of the international organizations
    the message sent to the counting office or reveal to auditors that do not have access to data at the local government nor at the international organization
    the message received from the international organization
    the keys 303a and 303b and indexes stored at the counting office
    the mixing table of the counting office
  to compare with the final list of published decrypted votes.

The present invention resides in a computer program product for providing confidentiality of a combination of content of a message and a sender 4 of the message. First program instructions are stored in a storage 31, for execution by a CPU 32 via a memory 33 within a final agent 3 of the message, -to provide to a first agent 1, interposed between the sender and the final agent, a first encryption key, the first agent but not the final agent knowing an identity of the sender. Second program instructions are stored in the storage 31, for execution by the CPU 32 via the memory 33 within the final agent 3, to provide a second agent 2, interposed between the sender and the final agent, a second encryption key, the second agent knowing an identity of the sender. Third program instructions are stored in a storage 11, for execution by a CPU 12 via a memory 13 within the first agent 1, to generate a third encryption key and provide to the 3 sender the first encryption key and the third encryption key. Fourth program instructions are stored in a storage 21, for execution by a CPU 22 via a memory 23 within the second agent 2, to generate a fourth encryption key and provide to the sender the second encryption key and the fourth encryption key. Fifth program instructions are stored in the storage 11, for execution by the CPU 12 via the memory 13 within the first agent 1, to receive from the sender a message encrypted with the first. second, third and fourth keys, and in response, decrypt the message based on the third key, and afterwards provide the message decrypted based on the third key to the second agent. In response, the second agent 2 including sixth program instructions stored in the storage 21 for execution by the CPU 22 via the memory 23 to decrypt based on the fourth key the message provided by the first agent. Seventh program instructions are stored in the storage 21 in the second agent 2 for execution by the CPU 22 via the memory 23 to provide the message decrypted based on the third and fourth keys to the final agent. In response, the final agent 3 including eighth program instructions stored in the storage 31 for execution by the CPU 32 via the memory 33 to decrypt, based on the first and second keys, the message decrypted based on the third and fourth keys.

Based on the foregoing, a system, method and program product for ensuring confidentiality of combinations of messages and message senders/senders. However, numerous modifications and substitutions can be made without deviating from the scope of the present invention. For example, there can be other numbers of agents than those described above. Therefore, the present invention has been disclosed by way of illustration and not limitation, and reference should be made to the following claims to determine the scope of the present invention.

The invention claimed is:

1. A method for providing confidentiality of a combination of content of a message and a sender of the message, said method comprising the steps of:

a final agent computer providing to a first agent computer, interposed between said sender and said final agent computer, a first encryption key, said first agent computer but not said final agent computer knowing an identity of said sender;

said final agent computer providing to a second agent computer, interposed between said sender and said final agent computer, a second encryption key, said second agent computer knowing an identity of said sender;

said first agent computer generating a third encryption key and providing to said sender said first encryption key and said third encryption key;

said second agent computer generating a fourth encryption key and providing to said sender said second encryption key and said fourth encryption key;

said first agent computer receiving from said sender a message encrypted with said first, second, third and fourth keys, and in response, decrypting said message based on said third key, and afterwards providing the message decrypted based on said third key to said second agent computer, and in response, said second agent computer decrypting, based on said fourth key, said message provided by said first agent computer; and providing the message decrypted based on said third and fourth keys to said final agent computer, and in response, said final agent computer decrypting, based on said first and second keys, said message decrypted based on said third and fourth keys.

2. A method as set forth in claim 1 wherein:

the step of said final agent computer providing said first encryption key to said first agent computer is performed by said final agent computer providing said first encryption key to a third agent computer interposed between said first agent computer and said final agent computer, and said third agent computer providing said first encryption key to said first agent computer or another agent computer interposed between said third agent computer and said first agent computer; and the step of said final agent computer providing said second encryption key to said second agent computer is performed by said final agent computer providing said second encryption key to a fourth agent computer interposed between said second agent computer and said final agent computer, and said fourth agent computer providing said second encryption key to said second agent computer or another agent computer interposed between said fourth agent computer and said second agent computer.

3. A method as set forth in claim 1 further comprising the steps of:

said final agent computer providing to said first agent computer a first index for said first key; and said final agent computer providing to said second agent computer a second index for said second key.

4. A method as set forth in claim 3 wherein:

the step of said first agent computer providing to said second agent computer the message decrypted based on said third key includes the step of said first agent computer supplying to said second agent computer said first index with the message decrypted based on said third key; and the step of providing the message decrypted based on said third and fourth keys to said final agent computer includes the step of said second agent computer supplying to said final agent computer said second index with the message decrypted based on said third and fourth keys.

5. A method as set forth in claim 1 wherein said third and fourth encryption keys are not known by said final agent computer.

6. A distributed computer system for providing confidentiality of a combination of content of a message and a sender of the message, said system comprising:

a first agent computer including a first CPU, a first memory and a first storage;

a second agent computer including a second CPU, a second memory and a second storage;

a final agent computer including a third CPU, a third memory and a third storage, said first agent computer interposed between said sender and said final agent computer, said second agent computer interposed between said sender and said final agent computer;

program instructions, stored in said third storage of said final agent computer for execution by said third CPU via said third memory, to provide a first encryption key to said first agent computer and a second encryption key to said second agent computer, said first agent computer and said second agent computer knowing and identity of said sender, said final agent computer not knowing an identity of said sender;

program instructions, stored in said first storage of said first agent computer for execution by said first CPU via said first memory, to generate a third encryption key and provide to said sender said first encryption key and said third encryption key;

program instructions, stored in said second storage of said second agent computer for execution by said second CPU via said second memory, to generate a fourth encryption key and provide to said sender said second encryption key and said fourth encryption key;

program instructions, stored in said first storage of said first agent computer for execution by said first CPU via said first memory, to receive from said sender a message encrypted with said first, second, third and fourth keys, and in response, decrypt said message based on said third key; program instructions, stored in said second storage of said second agent computer for execution by said second CPU via said second memory, to receive from said first agent computer the message decrypted based on said third key and decrypt, based on said fourth key, said message received from said first agent computer; and program instructions, stored in said third storage of said final agent computer for execution by said third CPU via said third memory, to receive from said second agent computer the message decrypted based on said third and fourth keys and decrypt, based on said first and second keys, said message received from said second agent computer.

7. A system as set forth in claim 6 further comprising:

program instructions, stored in said third storage of said final agent computer for execution by said third CPU via said third memory, to provide said first encryption key to said first agent computer via a third agent computer interposed between said first agent computer and said final agent computer; and, program instructions, stored in said third storage of said final agent computer for execution by said third CPU via said third memory to provide said second encryption key to said second agent computer via a fourth agent computer interposed between said second agent computer and said final agent computer.

8. A system as set forth in claim 6 further comprising:

program instructions, stored in said first storage of said first agent computer for execution by said first CPU via said first memory, to provide to said second agent computer a first index for said first key; and program instructions, stored in said second storage of said second agent computer for execution by said second CPU via said second memory, to provide to said final agent computer a second index for said second key.

9. A system as set forth in claim 8 further comprising:

program instructions, stored in said first storage of said first agent computer for execution by said first CPU via said first memory, to provide to said second agent computer the message decrypted based on said third key by said first agent computer supplying to said second agent computer said first index with the message decrypted based on said third key; and program instructions, stored in said second storage of said second agent computer for execution by said second CPU via said second memory, to supply to said final agent computer said second index with the message decrypted based on said third and fourth keys.

10. A computer system as set forth in claim 6 wherein said third and fourth encryption keys are not known by said final agent computer.

11. A computer program product for providing confidentiality of a combination of content of a message and a sender of the message, said computer program product comprising:

one or more computer readable storage media;

first program instructions, for execution within a final agent computer, to provide to a first agent computer, interposed between said sender and said final agent computer, a first encryption key, said first agent computer but not said final agent computer knowing an identity of said sender;

second program instructions, for execution within said final agent computer, to provide to a second agent computer, interposed between said sender and said final agent computer, a second encryption key, said second agent computer knowing an identity of said sender;

third program instructions, for execution within said first agent computer, to generate a third encryption key and provide to said sender said first encryption key and said third encryption key;

fourth program instructions, for execution within said second agent computer, to generate a fourth encryption key and provide to said sender said second encryption key and said fourth encryption key;

fifth program instructions, for execution within said first agent computer, to receive from said sender a message encrypted with said first, second, third and fourth keys, and in response, decrypt said message based on said third key; sixth program instructions, for execution within said second agent computer, to receive from said first agent computer said message decrypted based on said third key and decrypt, based on said fourth key, said message received from said first agent computer; and seventh program instructions, for execution within said final agent computer, to receive from said second agent computer said message decrypted based on said third and fourth keys and decrypt, based on said first and second keys, said message received from said second agent computer; and wherein said first, second, third, fourth, fifth, sixth and seventh program instructions are stored on said computer readable storage media.

12. A computer program product as set forth in claim 11 wherein said third and fourth encryption keys are not known by said final agent computer.

* * * * *